United States Patent [19]

Mally

[11] Patent Number: 5,393,083
[45] Date of Patent: Feb. 28, 1995

[54] COLLAPSIBLE BOAT TRAILER

[76] Inventor: Craig E. Mally, 7025 NE. 62nd Ave., Altoona, Iowa 50009

[21] Appl. No.: 203,825

[22] Filed: Mar. 1, 1994

[51] Int. Cl.$^6$ .............................................. B60P 3/10
[52] U.S. Cl. ............................... 280/414.1; 280/491.1
[58] Field of Search ............... 280/414.1, 414.2, 414.3, 280/415.1, 400, 401, 491.1

[56] References Cited

U.S. PATENT DOCUMENTS

| | | | |
|---|---|---|---|
| 2,608,418 | 8/1952 | Finlayson et al. | 280/414.1 |
| 2,779,602 | 1/1957 | Kimbro et al. | 280/414.1 |
| 2,938,735 | 5/1960 | Bennett | 280/414.1 |
| 3,051,503 | 8/1962 | Halperin | 280/414.1 |
| 4,214,774 | 7/1980 | Kluge | 280/414.1 |
| 5,176,394 | 1/1993 | Veazey | 280/414.1 |
| 5,320,371 | 6/1994 | Levad | 280/414.1 |

*Primary Examiner*—Karin L. Tyson
*Assistant Examiner*—Kevin Hurley

[57] ABSTRACT

Disclosed is a new collapsible boat trailer for low speed, short distance vehicle-towed transport, launching, and retrieval of lightweight boats which is quickly disassemblable without tools into small lightweight components for stowage. The collapsible boat trailer comprises a rigid frame which includes a tubular cross member with a forward extending towing bar coupling structure fixedly connected centrally intermediate the ends thereof. A wheel assembly extends downwardly from both ends of the cross member whereby the boat trailer may roll across the ground. The upper ends of the wheel assemblies are pivotally connected to the cross member such that they may be pivoted inwardly upwardly to lie adjacent the cross member for inoperable stowage. An elongated two-piece towing bar extends from the front of the towing bar coupling structure. The towing bar is separable from the frame, as are the two pieces of the towing bar separable from each other for inoperable stowage. The towing bar includes a ball hitch socket assembly connected to the proximal end thereof whereby the boat trailer may be connected to a conventional motor vehicle-mounted hitch ball for towing thereof. The towing bar additionally has a boat keel roller assembly and a winch assembly operably mounted thereon whereby facilitating loading a boat onto the boat trailer. The winch assembly may be adjusted over a plurality of discreet longitudinal adjustment positions on the towing bar. A brace assembly holds the cross member rigid normal the towing bar, being separable from the cross member and towing bar for inoperable stowage. A boat cradle assembly is mounted to the cross member whereupon the boat may be supported upright during operation of the boat trailer, the cradle being separable from the cross member for inoperable stowage. Locking pins snapidly secure the separable assemblies together in their operable positions, the locking pins being removable for disassembly when it is desired to stow the boat trailer.

7 Claims, 3 Drawing Sheets

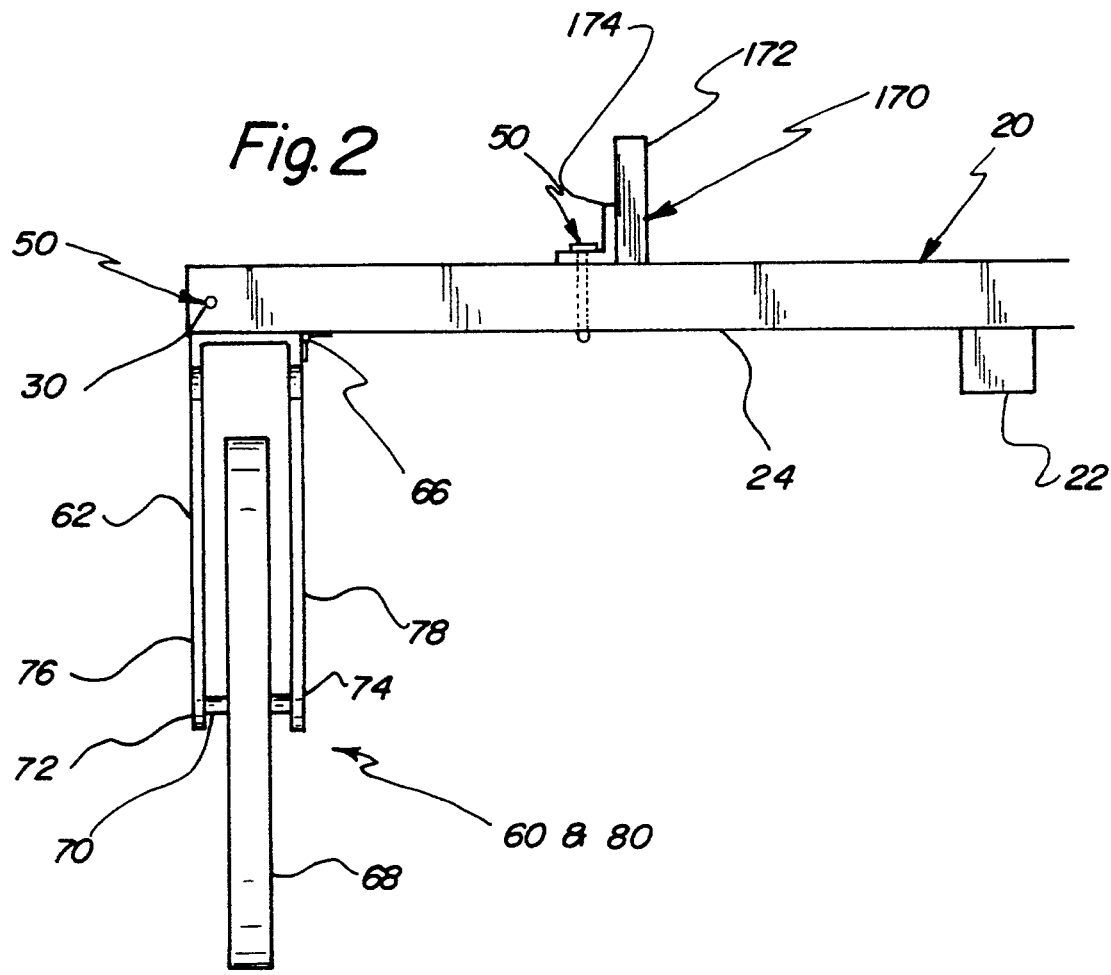
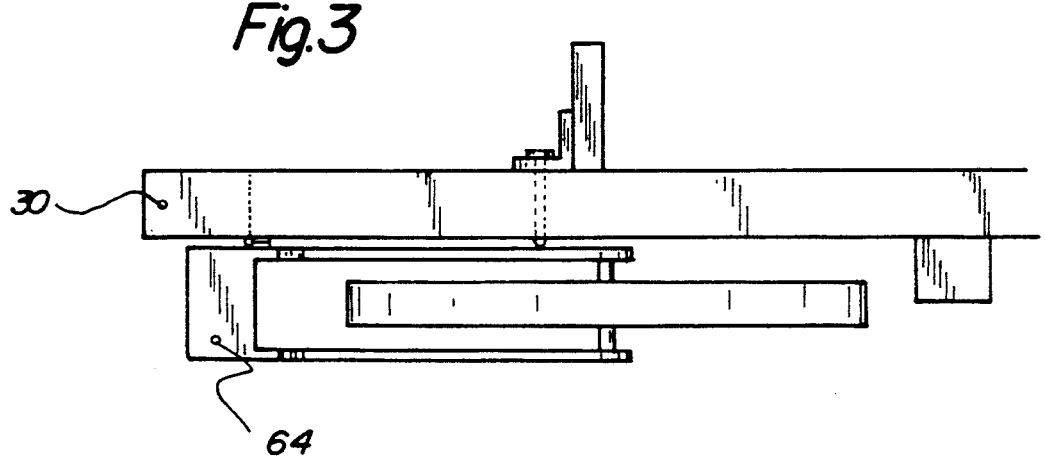

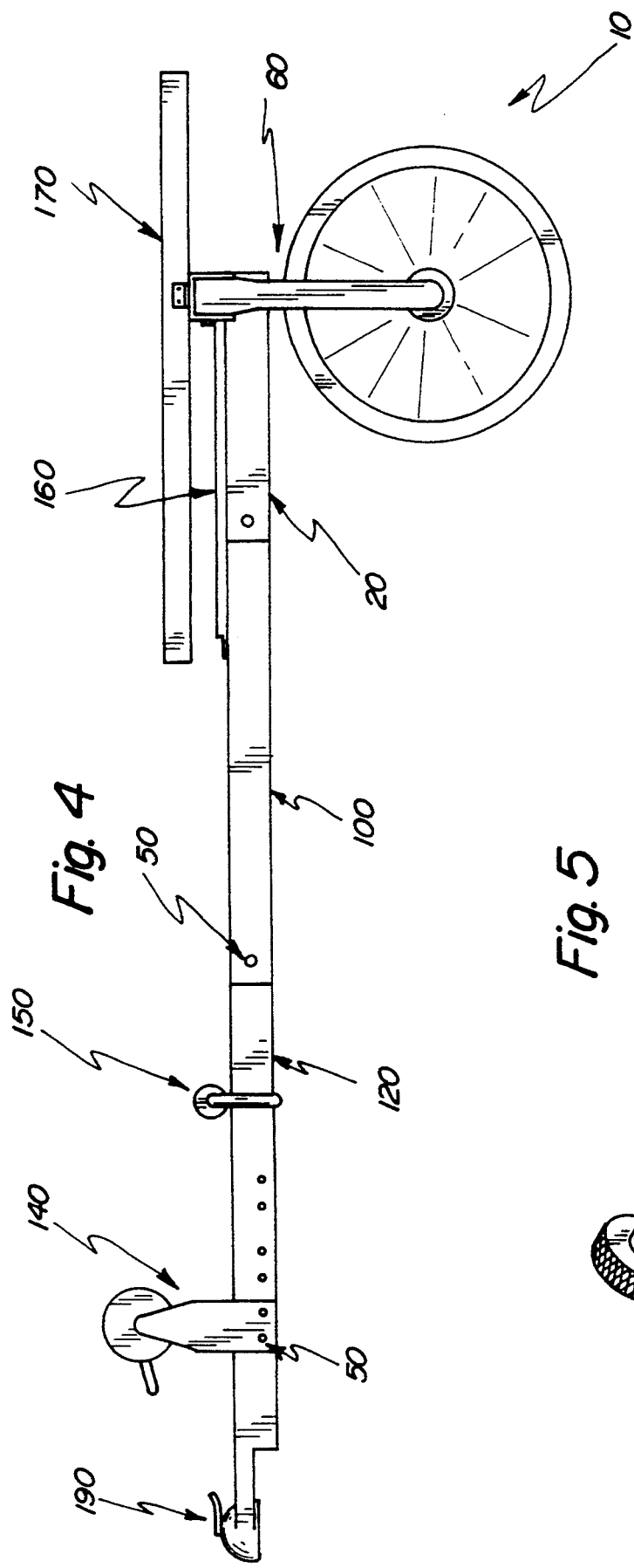
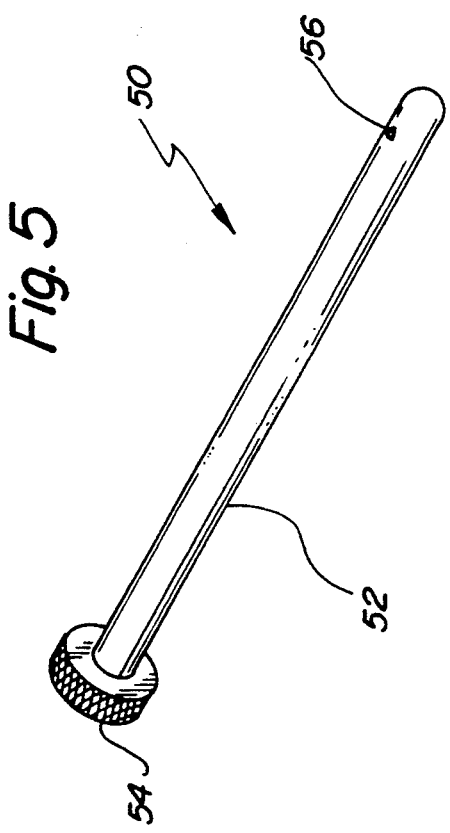

COLLAPSIBLE BOAT TRAILER

BACKGROUND OF THE INVENTION

1. Field of the Invention

The present invention relates to transport trailers and more particularly pertains to collapsible boat trailers which may be adapted for low speed, short distance vehicle-towed transport, launching, and retrieval of lightweight boats which is quickly disassemblable without tools into small lightweight components for stowage.

2. Description of the Prior Art

The use of transport trailers is known in the prior art. More specifically, transport trailers heretofore devised and utilized for the purpose of providing a wheeled support platform for transporting loads pulled behind motor vehicles are known to consist basically of familiar, expected and obvious structural configurations, notwithstanding the myriad of designs encompassed by the crowded prior art which have been developed for the fulfillment of countless objectives and requirements.

The present invention is directed to improving devices for low speed, short distance vehicle-towed transport, launching, and retrieval of lightweight boats in a manner which is safe, secure, economical and aesthetically pleasing.

For example, U.S. Pat. No. 3,955,830 to Hardwick discloses a foldable boat trailer which may be collapsed for easy storage or shipment and which may be used to suspend a boat thereunder for transporting a boat from one location to another. The arrangement of the trailer permits suspension of the boat by one person with minimal effort. The boat trailer described suspends the transported boat beneath the frame thereby exposing the boat to damage from objects on, or projecting from, the ground. Furthermore, the disclosure does not show a way to positively secure the boat to the trailer, as with a winch and cradle, for towing behind a vehicle.

The prior art also discloses folding and foldable trailers as shown in U.S. Pat. No. 4,362,316 to Wright, U.S. Pat. No. 4,758,008 to Moddejonge, and U.S. Pat. No. 4,786,073 to Harper, and a folding motorcycle transport trailer of U.S. Pat. No. 4,763,914 to Lemmons. While these devices fulfill their respective, particular objectives and requirements, the aforementioned patents do not disclose a collapsible boat trailer for low speed, short distance vehicle-towed transport, launching, and retrieval of lightweight boats. Furthermore, none of the prior art transport trailers teach or suggest a boat trailer which is quickly disassemblable, without tools, into small lightweight components.

In this respect, the collapsible boat trailer according to the present invention substantially departs from the conventional concepts and designs of the prior art, and in so doing provides an apparatus primarily developed for the purpose of low speed, short distance vehicle-towed transport, launching, and retrieval of lightweight boats which is quickly disassemblable without tools into small lightweight components for stowage.

Therefore, it can be appreciated that there exists a continuing need for new collapsible boat trailers which can be used for low speed, short distance vehicle-towed transport, launching, and retrieval of lightweight boats which is quickly disassemblable without tools into small lightweight components for stowage. In this regard, the present invention substantially fulfills this need.

As illustrated by the background art, efforts are continuously being made in an attempt to develop devices for providing a wheeled support platform for transporting loads pulled behind motor vehicles. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of transport trailers now present in the prior art, the present invention provides a new transport trailer construction wherein the same can be utilized for low speed, short distance vehicle-towed transport, launching, and retrieval of lightweight boats which is quickly disassemblable without tools into small lightweight components for stowage. As such, the general purpose of the present invention, which will be described subsequently in greater detail, is to provide a new collapsible boat trailer apparatus and method which has all the advantages of the prior art transport trailers and none of the disadvantages.

The invention is defined by the appended claims with the specific embodiment shown in the attached drawings. For the purpose of summarizing the invention, the invention may be incorporated into a new collapsible boat trailer for low speed, short distance vehicle-towed transport, launching, and retrieval of lightweight boats which is quickly disassemblable without tools into small lightweight components for stowage. The collapsible boat trailer comprises a rigid frame which includes a tubular cross member with a forward extending towing bar coupling structure fixedly connected centrally intermediate the ends thereof. The coupling structure has a longitudinal socket formed in the forward end thereof, the socket having a transverse locking pin hole therethrough. The cross member also has a transverse locking pin hole proximate each end thereof and a pair of forward opening sockets formed therein, each socket being intermediate the center and an opposing end of the cross member. The cross member further has a pair of vertically oriented locking pin holes therethrough, each vertical locking pin hole being intermediate the center and an opposing end of the cross member.

A wheel fork assembly extends downwardly from both ends of the cross member. The upper ends of the wheel fork assemblies are pivotally connected to the cross member with a hinge such that the fork assemblies may be pivoted inwardly upwardly to lie adjacent the cross member for inoperable stowage. The wheel fork assemblies each also have a locking pin hole therethrough cooperable with the locking pin holes proximate the cross member ends when the forks are in the operable position. A locking pin is removedly snapidly engaged with the locking pin holes to secure the wheel fork assemblies in the operable position. The wheel fork assemblies each additionally have a facing pair of axle mounting holes through the lower end of each fork arm. An axle extends transversely across the arms of each wheel fork assembly, the ends of each axle extending through the axle mounting holes. A wheel assembly is journelled from each of the axles whereby the boat trailer may roll across the ground.

The new collapsible boat trailer also includes an elongated towing bar extension member formed of rigid tubular material. The extension member has a longitudinal tongue projecting from the distal end thereof, the tongue having a transverse locking pin hole therethrough. The tongue is mated with the socket of the coupling structure when in the operable position and separable from the socket for inoperable stowage. A locking pin is removedly snapidly engaged with the locking pin holes to secure the tongue within the socket. The extension member also has a longitudinal socket formed in the proximal end thereof, the socket having a transverse locking pin hole therethrough. The extension member further has a vertically oriented locking pin hole therethrough intermediate the ends thereof. An elongated towing bar formed of rigid tubular material is additionally included. The towing bar has a longitudinal tongue projecting from the distal end thereof, the tongue having a transverse locking pin hole therethrough. The tongue is mated with the socket of the towing bar extension member when in the operable position and separable from the socket for inoperable stowage. A locking pin is removedly snapidly engaged with the locking pin holes to secure the tongue within the socket. The towing bar also has a ball hitch socket assembly connected to the proximal end thereof whereby the boat trailer may be operably connected to a conventional motor vehicle-mounted hitch ball for towing thereof. The towing bar additionally has a plurality of pairs of transverse locking pin holes therethrough near the proximal end thereof. The towing bar further has a boat keel roller assembly operably mounted thereon intermediate the pairs of locking pin holes and the distal end thereof.

A winch assembly projects upwardly from the towing bar whereby facilitating loading a boat onto the boat trailer. The winch assembly has a mounting bracket with a pair of transverse locking pin holes fixedly connected thereto. The winch assembly is removedly connected to the towing bar such that the mounting bracket locking pin holes align with one of the pairs of towing bar locking pin holes when in the operable position. A pair of locking pins is removedly snapidly engaged with the locking pin holes to secure the winch assembly to the towing bar. The winch assembly is separable from the towing bar for inoperable stowage. The winch assembly may be adjusted over a plurality of discreet longitudinal adjustment positions on the towing bar defined by the plurality of pairs of transverse locking pin holes through the towing bar.

A brace assembly comprising an opposing pair of brace arms extending horizontally outwardly from a connecting web is further included in the new collapsible boat trailer. The web has a vertically oriented locking pin hole therethrough aligned with the vertically oriented locking pin hole of the extension member when in the operable position and separable therefrom for inoperable stowage. A locking pin is removedly snapidly engaged with the locking pin holes to secure the web to the extension member. The free ends of the brace arms each engage one of the forward opening cross member sockets whereby the cross member is held rigid normal the towing bar in the operable position. The free ends of the brace arms are separable from the cross member sockets for inoperable stowage.

A boat cradle assembly comprising a pair of spaced apart rails is removedly mounted to the cross member parallel the towing bar whereupon a boat may be supported upright during operation of the boat trailer. The rails each have a bracket with a vertically oriented locking pin hole therethrough, the vertically oriented locking pin hole of each rail being aligned with one of the vertically oriented locking pin holes of the cross member when in the operable position and separable therefrom for inoperable stowage. A locking pin is removedly snapidly engaged with the locking pin holes to secure the rails to the cross member.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide an collapsible boat trailer for low speed, short distance vehicle-towed transport, launching, and retrieval of lightweight boats which is quickly disassemblable without tools into small lightweight components for stowage.

It is another object of the present invention to provide a new collapsible boat trailer which may be easily and efficiently manufactured and marketed.

It is a further object of the present invention to provide a new collapsible boat trailer which is of a durable and reliable construction.

An even further object of the present invention is to provide a new collapsible boat trailer which is susceptible of a low cost of manufacture with regard to both materials and labor, and which accordingly is then susceptible of low prices of sale to the consuming public, thereby making such collapsible boat trailers economically available to the buying public.

Still yet another object of the present invention is to provide a new collapsible boat trailer which provides in the apparatuses and methods of the prior art some of the advantages thereof, while simultaneously overcoming some of the disadvantages normally associated therewith.

Still yet another object of the present invention is to provide a new collapsible boat trailer that includes a winch, a keel roller, and a boat cradle to facilitate launching and retrieval of the boat by one person with minimal effort.

Yet another object of the present invention is to provide a new collapsible boat trailer that is designed to accommodate a wide variety of boats having different sizes and hull styles without requiring modification.

Even still another object of the present invention is to provide a new collapsible boat trailer that can receive a set of running lights and wiring harness.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a partial rear elevational view of the present invention illustrating a wheel assembly operatively extended.

FIG. 3 is the partial rear elevational view of FIG. 2 showing the wheel assembly retracted for stowage.

FIG. 4 is a left side elevational view of the invention of FIG. 1.

FIG. 5 is a perspective view of a locking pin illustrating its manner of construction.

DESCRIPTION OF THE PREFERRED EMBODIMENT

Figure 1:
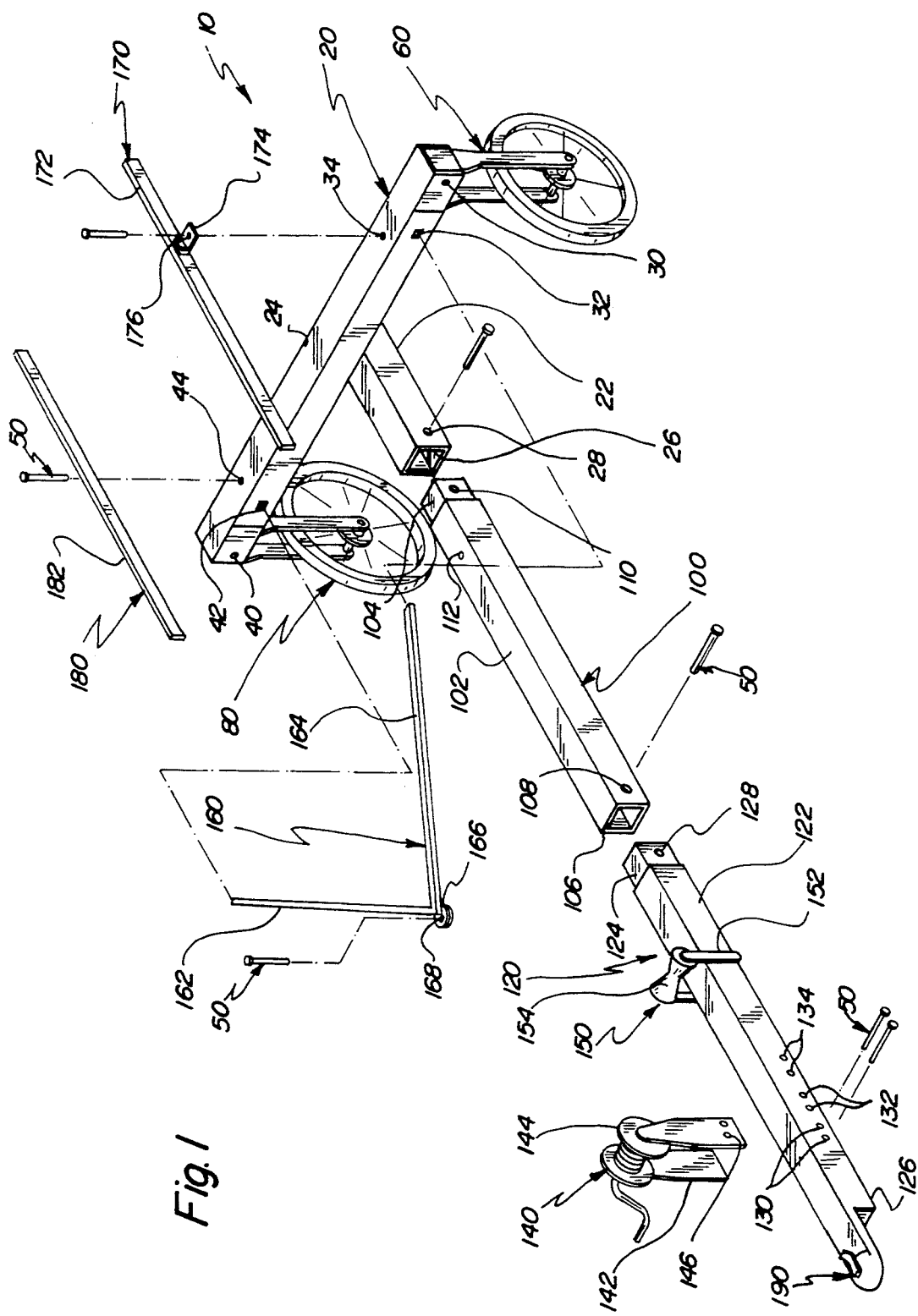
FIG. 1 is an exploded perspective view of the new collapsible boat trailer showing it's component parts and their manner of assembly.

With reference now to the drawings, and in particular to FIG. 1 thereof, a new collapsible boat trailer embodying the principles and concepts of the present invention and generally designated by the reference numeral 10 will be described.

From an overview standpoint, the collapsible boat trailer is adapted for use for low speed, short distance vehicle-towed transport, launching, and retrieval of lightweight boats which is quickly disassemblable without tools into small lightweight components for stowage. See FIG. 1.

With reference now to FIGS. 1-5 and more specifically, it will be noted that a new collapsible boat trailer 10 is shown. The collapsible boat trailer 10 comprises a rigid frame 20 which includes a tubular cross member 24 with a forward extending towing bar coupling structure 22 fixedly connected centrally intermediate the ends thereof. The coupling structure 22 has a longitudinal socket 26 formed in the forward end thereof, the socket 26 having a transverse locking pin hole 28 therethrough.

The cross member 24 also has a transverse locking pin hole 30 and 40 proximate each end thereof and a pair of forward opening sockets 32 and 42 formed therein, each socket being intermediate the center and an opposing end of the cross member 24. The cross member 24 further has a pair of vertically oriented locking pin holes 34 and 44 therethrough, each vertical locking pin hole 34 and 44 being intermediate the center and an opposing end of the cross member 24.

Shown best in FIGS. 2 and 3, a pair of identical wheel fork assemblies 60 and 80 extend downwardly, one from each end of the cross member 24. The upper end of each wheel fork assembly 62 is pivotally connected to the cross member 24 with a hinge 66 such that the fork assemblies 60 and 80 may be pivoted inwardly upwardly to lie adjacent the cross member 24 for inoperable stowage. The upper end of each wheel fork assembly 62 also has a locking pin hole 64 therethrough cooperable with the locking pin holes 30 and 40 proximate the cross member 24 ends when the forks 60 and 80 are in the operable position.

A locking pin 50 is removedly snapidly engaged with the locking pin holes 30, 40, and 64 to secure the wheel fork assemblies 60 and 80 in the operable position. The wheel fork assemblies 60 and 80 each additionally have a facing pair of axle mounting holes 72 and 74 through the lower end of each fork arm 76 and 78. An axle 70 extends transversely across the arms 76 and 78 of each wheel fork assembly 60 and 80, the ends of each axle 70 extending through the axle mounting holes 72 and 74. A wheel assembly 68 is journelled from the axle 70 whereby the boat trailer 10 may roll across the ground.

The new collapsible boat trailer 10 also includes an elongated towing bar extension member 100 formed of rigid tubular material. The extension member 100 has a longitudinal tongue 104 projecting from the distal end thereof, the tongue 104 having a transverse locking pin hole 110 therethrough. The tongue 104 is mated with the socket 26 of the coupling structure 22 when in the operable position and separable from the socket 26 for inoperable stowage.

A locking pin 50 is removedly snapidly engaged with the locking pin holes 26 and 110 to secure the tongue 104 within the socket 26. The extension member 100 also has a longitudinal socket 106 formed in the proximal end thereof, the socket 106 having a transverse locking pin hole 108 therethrough. The extension member 100 further has a vertically oriented locking pin hole 112 therethrough intermediate the ends thereof. An elongated towing bar 122 formed of rigid tubular material is additionally included. The towing bar 122 has a longitudinal tongue 124 projecting from the distal end thereof, the tongue 124 having a transverse locking pin hole 128 therethrough.

The tongue 124 is mated with the socket 106 of the towing bar extension member 100 when in the operable position and separable from the socket 106 for inoperable stowage. A locking pin 50 is removedly snapidly engaged with the locking pin holes 108 and 128 to secure the tongue 124 within the socket 106. The towing bar 122 also has a ball hitch socket assembly 190 connected to the proximal end thereof whereby the boat trailer 10 may be operably connected to a conventional motor vehicle-mounted hitch ball for towing thereof. The towing bar 122 additionally has a plurality of pairs of transverse locking pin holes 130 therethrough near the proximal end thereof. The towing bar 122 further has a boat keel roller assembly 150 operably mounted thereon intermediate the pairs of locking pin holes 130 and the distal end thereof.

A winch assembly 140 projects upwardly from the towing bar 122 whereby facilitating loading a boat onto the boat trailer 10. The winch assembly 140 has a mounting bracket 142 with a pair of transverse locking pin holes 146 fixedly connected thereto. The winch assembly 140 is removedly connected to the towing bar 122 such that the mounting bracket locking pin holes 146 align with one of the pairs of towing bar locking pin holes 130 when in the operable position.

A pair of locking pins 50 is removedly snapidly engaged with the locking pin holes 146 and 130 to secure the winch assembly 140 to the towing bar 122. The winch assembly 140 is separable from the towing bar 122 for inoperable stowage. The winch assembly 140 may be adjusted over a plurality of discreet longitudinal adjustment positions on the towing bar 122 defined by the plurality of pairs of transverse locking pin holes 130 through the towing bar.

A brace assembly 160 comprising an opposing pair of brace arms 162 and 164 extending horizontally outwardly from a connecting web 166 is further included in the new collapsible boat trailer 10. The web 166 has a vertically oriented locking pin hole 168 therethrough aligned with the vertically oriented locking pin hole 112 of the extension member 100 when in the operable position and separable therefrom for inoperable stowage. A locking pin 50 is removedly snapidly engaged with the locking pin holes 168 and 112 to secure the web 166 to the extension member 100. The free ends of the brace arms 162 and 164 each engage one of the forward opening cross member sockets 42 and 32 whereby the cross member 20 is held rigid normal the towing bar 122 in the operable position. The free ends of the brace arms 162 and 164 are separable from the cross member sockets 42 and 32 for inoperable stowage.

A boat cradle assembly 170 comprising a pair of spaced apart rails 172 and 182 is removedly mounted to the cross member 20 parallel the towing bar 122 whereupon a boat may be supported upright during operation of the boat trailer 10. The rails 172 and 182 each have a bracket 174 with a vertically oriented locking pin hole 174 therethrough, the vertically oriented locking pin hole 174 of each rail being aligned with one of the vertically oriented locking pin holes 34 and 44 of the cross member 20 when in the operable position and separable therefrom for inoperable stowage. A locking pin 50 is removedly snapidly engaged with the locking pin holes 34, 44, and 174 to secure the rails 172 and 182 to the cross member 20.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,
What is claimed is:

1. A new collapsible boat trailer for low speed, short distance vehicle-towed transport, launching, and retrieval of lightweight boats which is quickly disassemblable without tools into small lightweight components for stowage, the collapsible boat trailer comprising a plurality of components, the components comprising:

a rigid frame comprising a tubular cross member with a forward extending towing bar coupling structure fixedly connected centrally intermediate the ends thereof, the coupling structure having a longitudinal socket formed in the forward end thereof, the socket having a transverse locking pin hole therethrough, the cross member also having a transverse locking pin hole proximate each end thereof, the cross member additionally having a pair of forward opening sockets formed therein, each socket being intermediate the center and an opposing end of the cross member, the cross member further having a pair of vertically oriented locking pin holes therethrough, each vertical locking pin hole being intermediate the center and the opposing end of the cross member;

a wheel fork assembly extending downwardly from both ends of the cross member, upper ends of the wheel fork assemblies being pivotally connected to the cross member such that the fork assemblies may be pivoted inwardly upwardly to lie adjacent the cross member for inoperable stowage, the wheel fork assemblies each also having a locking pin hole therethrough cooperable with the locking pin holes proximate the cross member ends when the forks are in an operable position, the wheel fork assemblies each additionally having a pair of back arms and a facing pair of axle mounting holes through the lower end of each fork arm;

an axle extending transversely across the arms of each wheel fork assembly, the ends of each axle extending through the axle mounting holes;

a wheel assembly journalled from each of the axles whereby the boat trailer may roll across the ground;

an elongated towing bar extension member formed of rigid tubular material, the extension member having a longitudinal tongue projecting from a distal end thereof, the tongue having a transverse locking pin hole therethrough, the tongue being mated with the socket of the coupling structure when in the operable position and separable from the socket for inoperable stowage, the extension member also having a longitudinal socket formed in a proximal end thereof, the socket having a transverse locking pin hole therethrough, the extension member further having a vertically oriented locking pin hole therethrough intermediate the ends thereof;

an elongated towing bar formed of rigid tubular material, the towing bar having a longitudinal tongue projecting from a distal end thereof, the tongue having a transverse locking pin hole therethrough, the tongue being mated with the socket of the towing bar extension member when in the operable position and separable from the socket for inoperable stowage, the towing bar also having a ball hitch socket assembly connected to a proximal end thereof whereby the boat trailer may be operably connected to a conventional motor vehicle-mounted hitch ball for towing thereof, the towing bar additionally having a plurality of pairs of transverse locking pin holes therethrough near the proximal end thereof, the towing bar further having a boat keel roller assembly operably mounted thereon intermediate the pairs of locking pin holes and the distal end thereof;

a winch assembly projecting upwardly from the towing bar whereby facilitating loading a boat onto the boat trailer, the winch assembly having a mounting bracket with a pair of transverse locking pin holes fixedly connected thereto, the winch assembly being removedly connected to the towing bar such that the mounting bracket locking pin holes align with one of the pairs of towing bar locking pin holes when in the operable position, the winch assembly being separable from the towing bar for inoperable stowage, the winch assembly having a plurality of discreet longitudinal adjustment positions on the towing bar defined by the plurality of pairs of transverse locking pin holes through the towing bar;

a brace assembly comprising an opposing pair of brace arms extending horizontally outwardly from a connecting web, the web having a vertically oriented locking pin hole therethrough, the web locking pin hole being aligned with the vertically oriented locking pin hole of the extension member when in the operable position and separable therefrom for inoperable stowage, free ends of the brace arms each engaging one of the forward opening cross member sockets whereby the cross member is held rigid normal the towing bar in the operable position, the free ends of the brace arms being separable from the cross member sockets for inoperable stowage;

a boat cradle assembly comprising a pair of spaced apart rails removedly mounted to the cross member parallel the towing bar whereupon a boat may be supported upright during operation of the boat trailer, the rails each having a bracket with a vertically oriented locking pin hole therethrough, the vertically oriented locking pin hole of each rail being aligned with one of the vertically oriented locking pin holes of the cross member when in the operable position and separable therefrom for inoperable stowage; and a locking pin extending through each of the locking pin holes when the boat trailer is assembled for operation, the locking pins being removedly snapidly engaged within the holes whereby each of the components of the boat trailer is held in operable alignment with it's mating part, the locking pins being separable from the locking pin holes when the boat trailer is disassembled for inoperable stowage.

2. A new collapsible boat trailer for low speed, short distance vehicle-towed transport, launching, and retrieval of lightweight boats which is quickly disassemblable without tools into small lightweight components for stowage, the collapsible boat trailer comprising a plurality of separable components, the separable components comprising:

a rigid frame comprising a tubular cross member with a forward extending towing bar coupling structure fixedly connected thereto;

a wheel assembly operably extending downwardly from each end of the cross member such that the boat trailer may roll across the ground, the wheel assemblies being pivotally connected to the cross member such that they may be pivoted inwardly upwardly to lie adjacent the cross member for inoperable stowage;

an elongated towing bar operably extending longitudinally from the front of the towing bar coupling structure, the towing bar being separable from the towing bar coupling structure for inoperable stowage, the towing bar also being separable intermediate it's ends into front and rear sections thereof for inoperable stowage;

towing hitch means fixedly connected to a proximal end of the towing bar front section;

winch means operably connected to the towing bar front section near the proximal end thereof whereby facilitating loading a boat onto the boat trailer, the winch means being separable from the towing bar for inoperable stowage;

a boat keel roller assembly fixedly mounted to the towing bar front section intermediate the winch means and a distal end thereof;

brace means operably extending from the tow bar rear section intermediate the ends thereof to the cross member intermediate a center and each end thereof whereby the cross member is held rigid normal the towing bar, the brace means being separable from the towing bar and the cross member for inoperable stowage; and cradle means operably mounted on the cross member whereupon the boat may be supported, the cradle means being separable from the cross member for inoperable stowage.

3. The collapsible boat trailer of claim 2 wherein the wheel assemblies each comprise: a wheel fork having downwardly projecting spaced apart parallel arms; an axle extending transversely across the arms near lower ends thereof; and a wheel journalled from the axle.

4. The collapsible boat trailer of claim 3 wherein the towing hitch means comprises a ball hitch socket assembly whereby the boat trailer may be operably connected to a conventional motor vehicle-mounted ball hitch for towing thereof.

5. The collapsible boat trailer of claim 4 wherein the winch means may be longitudinally adjusted over a plurality of discreet positions on the towing bar.

6. The collapsible boat trailer of claim 5 wherein the cradle means comprises a pair of spaced apart rails removedly mounted to the cross member parallel the towing bar.

7. The collapsible boat trailer of claim 6 wherein the separable components include alignable locking pin holes, the locking pin holes being aligned when the components are operably assembled, the operably assembled components being connected together with locking pins extending through the aligned locking pin holes, the locking pins being removedly snapidly engaged within the holes whereby each of the components of the boat trailer is held in operable alignment with it's mating part, the locking pins being separable from the locking pin holes when the boat trailer is disassembled for inoperable stowage.

* * * * *